(12) United States Patent
Johnston

(10) Patent No.: US 6,928,150 B2
(45) Date of Patent: Aug. 9, 2005

(54) CALL CHARGING NOTIFICATION

(75) Inventor: Alan Bernard Johnston, St. Louis, MO (US)

(73) Assignee: MCI, Inc., Ashburn, VA (US)

( * ) Notice: Subject to any disclaimer, the term of this patent is extended or adjusted under 35 U.S.C. 154(b) by 210 days.

(21) Appl. No.: 10/016,111

(22) Filed: Dec. 17, 2001

(65) Prior Publication Data

US 2003/0112932 A1 Jun. 19, 2003

(51) Int. Cl.[7] .................. H04M 15/00; H04J 1/02
(52) U.S. Cl. .................. 379/114.01; 379/114.05; 379/114.21; 370/495
(58) Field of Search .................. 379/114.01, 114.03, 379/114.05, 114.06, 114.07, 114.21, 114.28, 114.29, 115.01, 121.01, 112, 127.05, 130, 133, 136; 370/352, 466, 495, 395.5, 469, 493, 494; 705/52, 409

(56) References Cited

U.S. PATENT DOCUMENTS

| | | | | |
|---|---|---|---|---|
| 4,868,758 A | * | 9/1989 | Kokubu | 705/400 |
| 5,559,871 A | | 9/1996 | Smith | |
| 5,946,670 A | * | 8/1999 | Motohashi et al. | 705/400 |
| 6,002,755 A | * | 12/1999 | Frank et al. | 379/130 |
| 6,181,785 B1 | * | 1/2001 | Adams et al. | 379/114.01 |
| 6,195,543 B1 | | 2/2001 | Granberg | |
| 6,212,506 B1 | * | 4/2001 | Shah et al. | 705/418 |
| 6,259,778 B1 | * | 7/2001 | Corwith | 379/115.01 |
| 6,263,058 B1 | * | 7/2001 | Lautenschlager et al. | 379/114.29 |
| 6,330,312 B1 | | 12/2001 | Wright et al. | |
| 6,442,260 B1 | * | 8/2002 | Simonen | 379/130 |
| 6,601,099 B1 | * | 7/2003 | Corneliussen | 709/224 |

FOREIGN PATENT DOCUMENTS

| | | |
|---|---|---|
| EP | 1199852 A1 | 4/2002 |
| WO | 99/62036 | 12/1999 |

OTHER PUBLICATIONS

Newton, Harry, Newton's Telecom Dictionary, Miller Freeman, Inc. 1999, 15th edition, p. 127.*

FritzGerald, Jerry and Allan Dennis, Business Data Communications and Networking, John Wiley & Sons, Inc. 1999, 6th edition pp. 423–425.*

* cited by examiner

Primary Examiner—Quoc Tran (57) ABSTRACT

An approach for providing charging information of a call established over a data network is disclosed. A communications system includes a user agent that initiates a call to another user agent according to an application layer protocol. The system also includes a network element that assists in establishing the call and forwards information indicating that the call is chargeable to the user agent. The present invention has particular applicability to SIP (Session Initiation Protocol) IP (Internet Protocol) telephony services.

23 Claims, 5 Drawing Sheets

CALL CHARGING NOTIFICATION

FIELD OF THE INVENTION

The present invention relates to a communications system, and is more particularly related to call processing over a data network.

BACKGROUND OF THE INVENTION

The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as Voice-over-IP (VOIP), is the conversion of voice information into data packets that are transmitted over an IP network. Users also have turned to IP telephony as a matter of convenience in that both voice and data services are accessible through a single piece of equipment, namely a personal computer. The continual integration of voice and data services further fuels this demand for IP telephony applications. One important area of call processing is billing, particularly when the call is established over a data network with many possible call paths.

The Session Initiation Protocol (SIP) has emerged to address the signaling of calls over an IP network. As an end-to-end protocol, SIP advantageously permits the end nodes with the capability to control call processing. By contrast, traditional telephony services are totally controlled by the intermediate network components; that is, the switches have full control over call establishment, switching, and call termination. In the SIP architecture, it is sometimes desirable for an intermediate network element to control the call processing, particularly as it relates to billing.

For example, in the Public Switched Telephone Network (PSTN), a caller is billed based on the phone number that they dial to originate the call. In most cases, the caller pays for calls that they originate. With great difficulty and expense, more creative charging models have been developed in the PSTN, including 800 service, 900 service, etc. However, no mechanism exists for a caller to find out how much a particular call will cost until after the fact—i.e., usually, when the bill arrives.

Therefore, there is a need for an approach for timely notifying a caller of the charges associated with a voice call over a data network. There is also a need to provide telephony services economically. Further, there is also a need to preserve a standard architecture to promote deployment of network services.

SUMMARY OF THE INVENTION

These and other needs are addressed by the present invention in which a data communication systems supports telephony services such that the caller is provided with charging information. The system adds charging indicators and rates to an application layer protocol (e.g., Session Initiation Protocol (SIP)) call setup message exchange, thereby allowing a caller to know before a call completes that there will be a charge, and what that charge will be once the call completes. This information is conveyed using visual and/or audio indicators to the caller. A predetermined SIP provisional response is used to convey charging information about "to-be-established" sessions. A special SIP header is employed in either a provisional or final response to provide charging information. The above approach advantageously provides telephony services cost-effectively.

In one aspect of the present invention, a communication system for providing charging information of a call established over a data network is disclosed. The system includes a user agent that is configured to initiate a call to another user agent according to an application layer protocol. The system also includes a network element that is configured to assist in establishing the call and to forward information indicating that the call is chargeable to the user agent.

In another aspect of the present invention, a method for providing charging information of a call established over a data network is disclosed. The method includes establishing a call between a user agent and another user agent according to an application layer protocol. The method also includes forwarding information indicating that the call is chargeable to the user agent.

In another aspect of the present invention, a communication system for providing charging information of a call established over a data network is disclosed. The system includes means for establishing a call between a user agent and another user agent according to an application layer protocol. The system also includes means for forwarding information indicating that the call is chargeable to the user agent.

In another aspect of the present invention, a network apparatus for providing charging information of a call established over a data network is disclosed. The apparatus includes a communications interface that is configured to receive a message from a user agent to establish a call to another user agent according to an application layer protocol. The apparatus also includes a processor that is coupled to the communications interface and configured to instruct the communications interface to forward information indicating that the call is chargeable to the user agent.

In yet another aspect of the present invention, a computer-readable medium carrying one or more sequences of one or more instructions for providing charging information of a call established over a data network is disclosed. The one or more sequences of one or more instructions include instructions which, when executed by one or more processors, cause the one or more processors to perform the step of establishing a call between a user agent and another user agent according to an application layer protocol. Another step includes forwarding information indicating that the call is chargeable to the user agent.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is discussed with respect to the Session Initiation Protocol (SIP), it should be appreciated that one of ordinary skill in the art would recognize that the present invention has applicability to other equivalent communication protocols.

Figure 1:
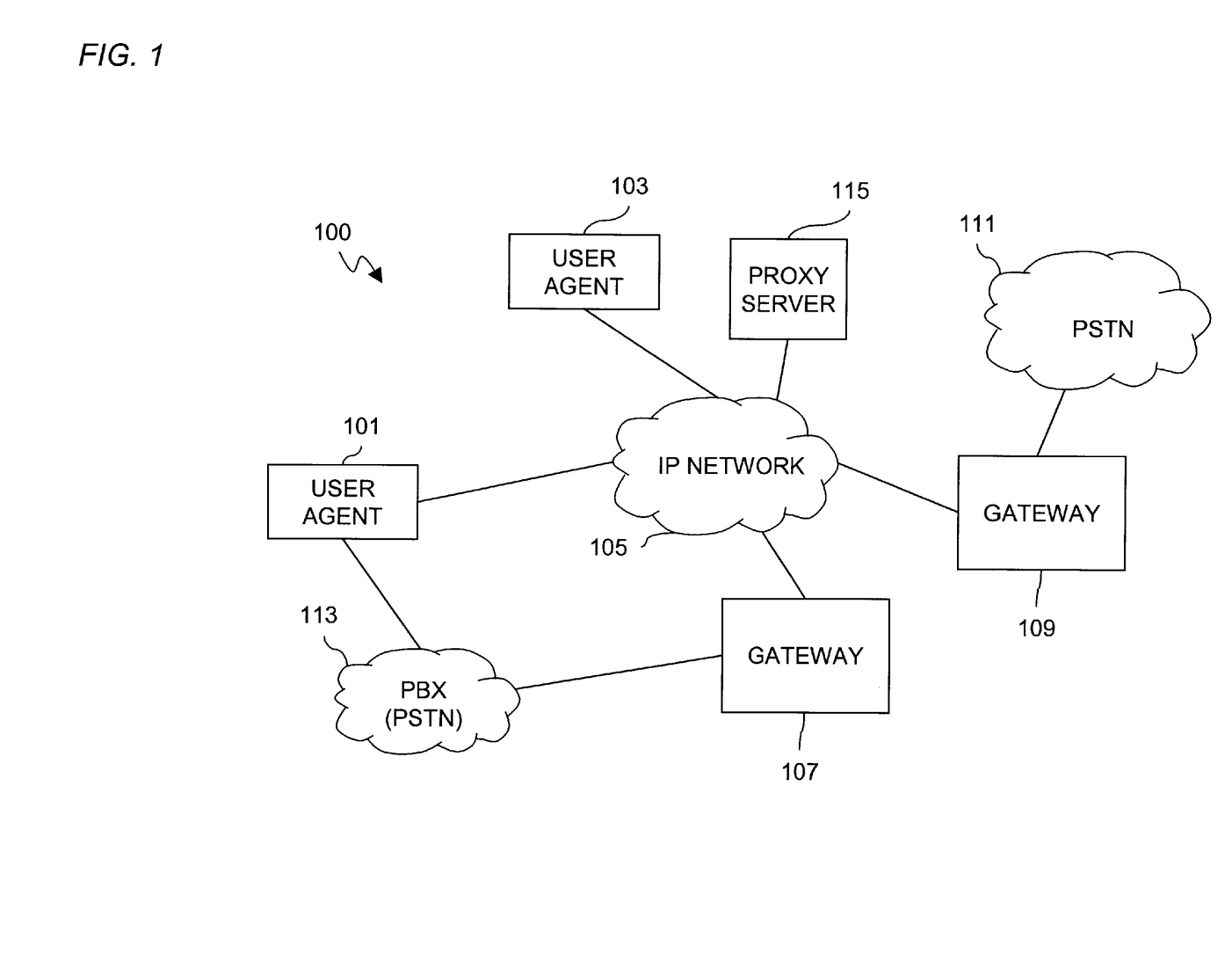
FIG. 1 is a diagram of a communication system capable of providing call charging notification, according to an embodiment of the present invention.

FIG. 1 is a diagram of a communication system capable of providing call charging notification, according to an embodiment of the present invention. In particular, the communication system 100 supports Internet Protocol (IP) telephony services among multiple user agents 101, 103, which are more fully described below. The user agents 101, 103 exchange messages over the IP network 105 using an application layer protocol, such as the Session Initiation Protocol (SIP).

The system 100 supports the capability for the user agent 101, 103 that initiates a call over the network 105 to receive notification of charging information on a near-real time basis. The system 100 utilizes one or more gateways 107, 109 to support call establishment among the user agents 101, 103 over the IP network 105; these gateways 107, 109 may be referred to as Voice over IP (VOIP) gateways. As shown, the user agent 103 is connected to the Public Switched Telephone Network (PSTN) 111. In this example, the user agent 101 has connectivity to a Private Branch Exchange (PBX), which in turn, passes calls through to the PSTN 111; alternatively, the user agent 101 may couple to the PSTN 111 directly.

Because the PSTN 111 is connected to the IP network 105, communication among voice stations (not shown) that are serviced through the PSTN 111, and personal computers that are attached to the IP network 105 can be established (e.g., VOIP). With respect to voice calls over the IP network 105, four possible scenarios exist with the placement of a VOIP call: (1) phone-to-phone, (2) phone-to-PC, (3) PC-to-phone, and (4) PC-to-PC. In the first scenario of phone-to-phone call establishment, a voice station is switched through PSTN 111 by a switch to a VOIP gateway 107, 109, which forwards the call through the IP network 105. The packetized voice call is then routed through the IP network 105, exiting the IP network 105 at an appropriate point to enter the PSTN 111 and terminates at a voice station. Under the second scenario, a voice station places a call to a PC through a switch to the PSTN 111. This voice call is then switched by the PSTN 111 to a VOIP gateway 107, 109, which forwards the voice call to a PC via the IP network 105. The third scenario involves a PC that places a call to a voice station. Using a voice encoder, the PC introduces a stream of voice packets into the IP network 105 that are destined for a VOIP gateway (not shown). The VOIP gateway 107, 109 converts the packetized voice information into a POTS (Plain Old Telephone Service) electrical signal, which is circuit switched to the voice station. Lastly, in the fourth scenario, a PC establishes a voice call with a PC; in this case, packetized voice data is transmitted from the PC via the IP network 105 to another PC, where the packetized voice data is decoded.

According to an embodiment of the present invention, the system 100 employs the Session Initiation Protocol (SIP) to exchange messages. A detailed discussion of SIP and its call control services are described in IETF RFC 2543 and IETF Internet draft "SIP Call Control Services", Jun. 17, 1999; both of these documents are incorporated herein by reference in their entireties. SIP messages are either requests or responses. The user agents 101, 103 may behave as either a user agent client (UAC) or a user agent server (UAS), depending on the services that the system 100 is executing. In general, a user agent client issues requests, while a user agent server provides responses to these requests. In the system 100 of FIG. 1, the gateways 107, 109 are user agent servers.

SIP defines various types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request.

Another method is a BYE request, which indicates to the UAS that the call should be released. In other words, BYE terminates a connection between two users or parties in a conference. The next method is the OPTIONS method; this method solicits information about capabilities and does not assist with establishment of a call. Lastly, the REGISTER provides information about a user's location to a SIP server.

The system 100 permits the calling user agent 101, 103 to receive charging information (e.g., rates), for example, during a call establishment to notify the user (i.e., caller) that the call is chargeable as well as the amount of the call during the call and/or upon completion of the call. Further, the system 100 may have connectivity to a number of PSTNs, of which only PSTN 111 is shown. Accordingly, the charging information that is known prior to call establishment can be used to select the most economical route (i.e., call path) to terminate a call from one of the user agents 101, 103.

In particular, the present invention, according to one embodiment, introduces charging indicators and rates to a SIP call setup message exchange to alert a SIP caller that a charge will apply before a call completes, and the amount of the charge upon completion of the call. A SIP provisional response code 188 Media Charges May Apply may be sent by a user agent server (e.g., gateways 107, 109 or some other SIP device which is providing some service for the RTP media stream) to a calling user agent 101, 103; it is noted that in general any unused 1xx SIP response code could be assigned this Media Charges May Apply response. The calling user agent 101, 103 upon receipt of the response code can present the information to the user in a number of ways, depending on the SIP-enabled device. For instance, a LED display of a SIP phone can be used as a Charge Indicator Light, in which the light is "On" when the call is chargeable. Alternatively, a message may be flashed upon a PC screen to notify the user that the call is chargeable as well as the amount of the charge. Additionally, an audible ring tone may be employed to indicate to the user that the call has an associated charge.

Charging information can be further used to determine the most cost-effective call path through the network 105. With SIP, a proxy server 115 is used to make routing decisions for a voice call. For example, the proxy server 115 may route a call to a gateway 107, 109 that would then turn a flat rate call into a call with media charges (per minute or per bit). The gateways 107, 109 (which is behaving as a user agent server) can use the alerting time to lookup the charge rate structure. This information could then be passed to the user agents 101, 103 (which are behaving as user agent clients) in a special SIP header, denoted as "Charge-Info" (shown in FIG. 2, below).

The Charge-Info header may be used in a number of ways prior to the phone call being placed. Since a SIP user agent server (e.g., gateways 107, 109) responds to an OPTIONS request in the same way as an INVITE, the calling user agent 101, 103 could first send an OPTIONS that would be routed to the gateway 107, 109, which would then return a 200 OK containing the Charge-Info header. This exchange enables the caller to know the charge schedule prior to making the call. Accordingly, the user agent 101, 103 that initiates the call could then either abandon the call based on the charging information, or log the information for later automatic bill reconciliation.

In accordance with one embodiment of the present invention, the above mechanism utilizing OPTIONS can be implemented in the SIP Proxy Server 115 on behalf of a SIP Phone (e.g., user agents 101, 103). For example, a number of IP Telephony Service Providers could be sent OPTIONS simultaneously, and the resulting responses Charge-Info headers used to select the least expensive carrier at that moment for that particular call. The Charge-Info header could also be present in a 18x response and used in a similar way to the 188 response code.

Therefore, the present invention extends the SIP protocol to provide information about billing and charging. To appreciate the present invention, a brief description of the SIP protocol architecture is now described with respect to FIG. 2.

Figure 2:
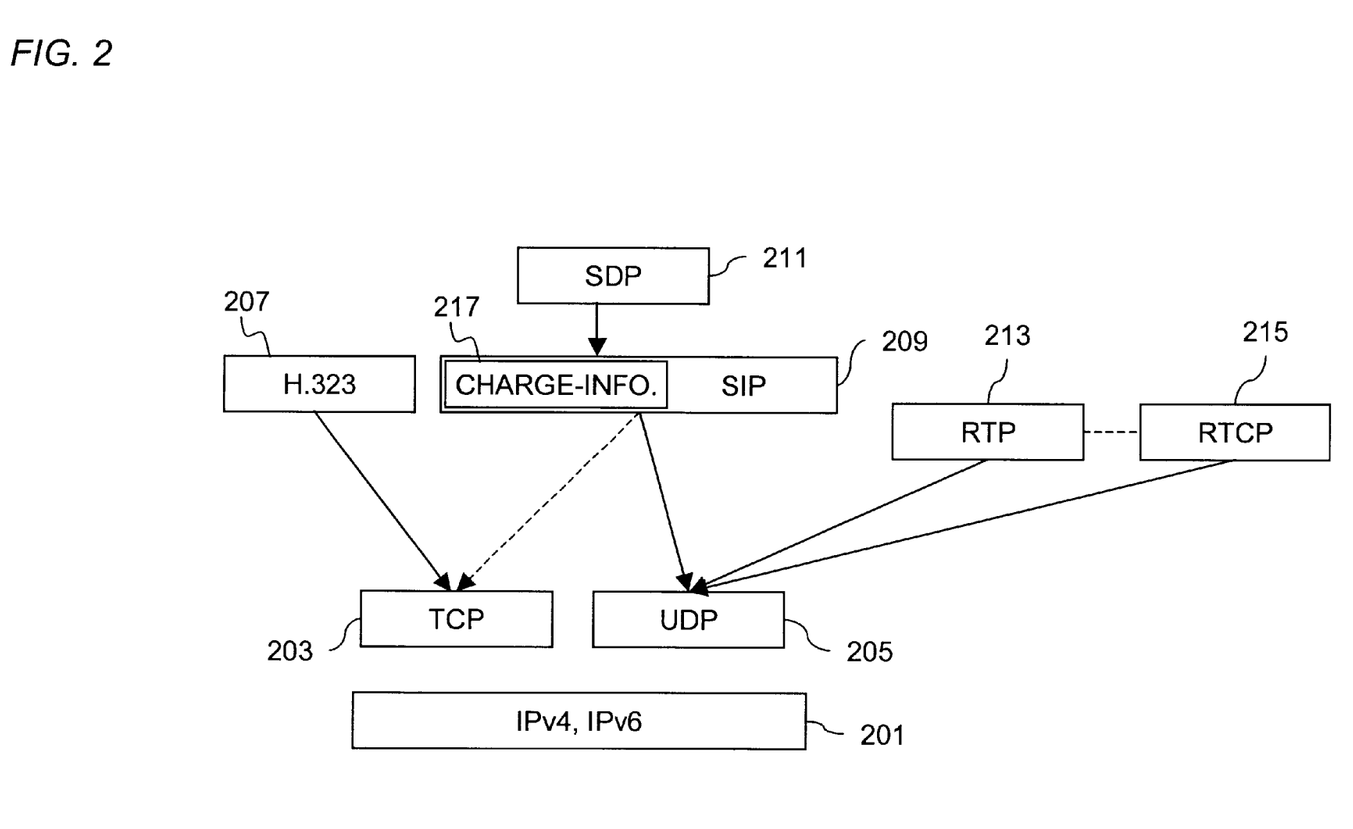
FIG. 2 is a diagram of an exemplary protocol architecture employed in the system of FIG. 1.

FIG. 2 is a diagram of an exemplary protocol architecture employed in the system of FIG. 1. The layered nature of the architecture provides protocol separation and independence, whereby one protocol can be exchanged or modified without affecting the other higher layer or lower layer protocols. It is advantageous that the development of these protocols can occur concurrently and independently.

The foundation of the architecture rests with the IP layer 201. The IP layer 201 provides an unreliable, connectionless data delivery service at the network level. The service is "unreliable" in the sense that the delivery is on a "best effort" basis; that is, no guarantees of packet delivery are made. IP is the de facto Internet working protocol standard. Current standards provide two versions of IP: Version 4 and Version 6. One of the key differences between the versions concerns addressing; under Version 4, the address fields are 32 bits in length, whereas in Version 6, the address field has been extended to 128 bits.

Above the IP layer 201 are the TCP (Transmission Control Protocol) 203 and the UDP (User Datagram Protocol) 205. The TCP layer 203 provides a connection-oriented protocol that ensures reliable delivery of the IP packets, in part, by performing sequencing functions. This sequencing function reorders any IP packets that arrive out of sequence. In contrast, the User Datagram Protocol (UDP) 205 provides a connectionless service that utilizes the IP protocol 201 to send a data unit, known as a datagram. Unlike TCP 203, UDP 205 does not provide sequencing of packets, relying on the higher layer protocols to sort the information. UDP 205 is preferable over TCP 203 when the data units are small, which saves processing time because of the minimal reassembly time. One of ordinary skill in the art would recognize that embodiments of the present invention can be practiced using either TCP 203 or UDP 205, as well as other equivalent protocols.

The next layer in the IP telephony architecture of FIG. 2 supplies the necessary IP telephony signaling and includes the H.323 protocol 207 and the Session Initiation Protocol (SIP) 209. The H.323 protocol 207, which is promulgated by the International Telecommunication Union (ITU), specifies a suite of protocols for multimedia communication. SIP 209 is a competing standard that has been developed by the Internet Engineering Task Force (IETF). SIP 209 is a signaling protocol that is based on a client-server model. It should be noted that both the H.323 protocol 207 and SIP 209 are not limited to IP telephony applications, but have applicability to multimedia services in general. In the system 100, SIP 209 is used to create and terminate voice calls over an IP network 105. However, it is understood that one of ordinary skill in the art would realize that the H.323 protocol 207 and similar protocols can be utilized in lieu of SIP 209. Above SIP 209 is the Session Description Protocol (SDP) 211, which provides information about media streams in the multimedia sessions, as to permit the recipients of the session description to participate in the session.

In an embodiment of the present invention, SIP 209 includes header information (Charge-Info header) to contain charging information associated with a particular call session. As mentioned, the Charge-Info header may be present in a 18x response and used in a similar way to the 188 response code. This Charge-Info header, in an exemplary embodiment, may contain the following information: the actual charging rate; a link (or Uniform Resource Locator (URL)) that contains information in human readable form; a link (or URL) that contains information in a standard markup, such as extensible Mark-up Language (XML).

Figure 3:
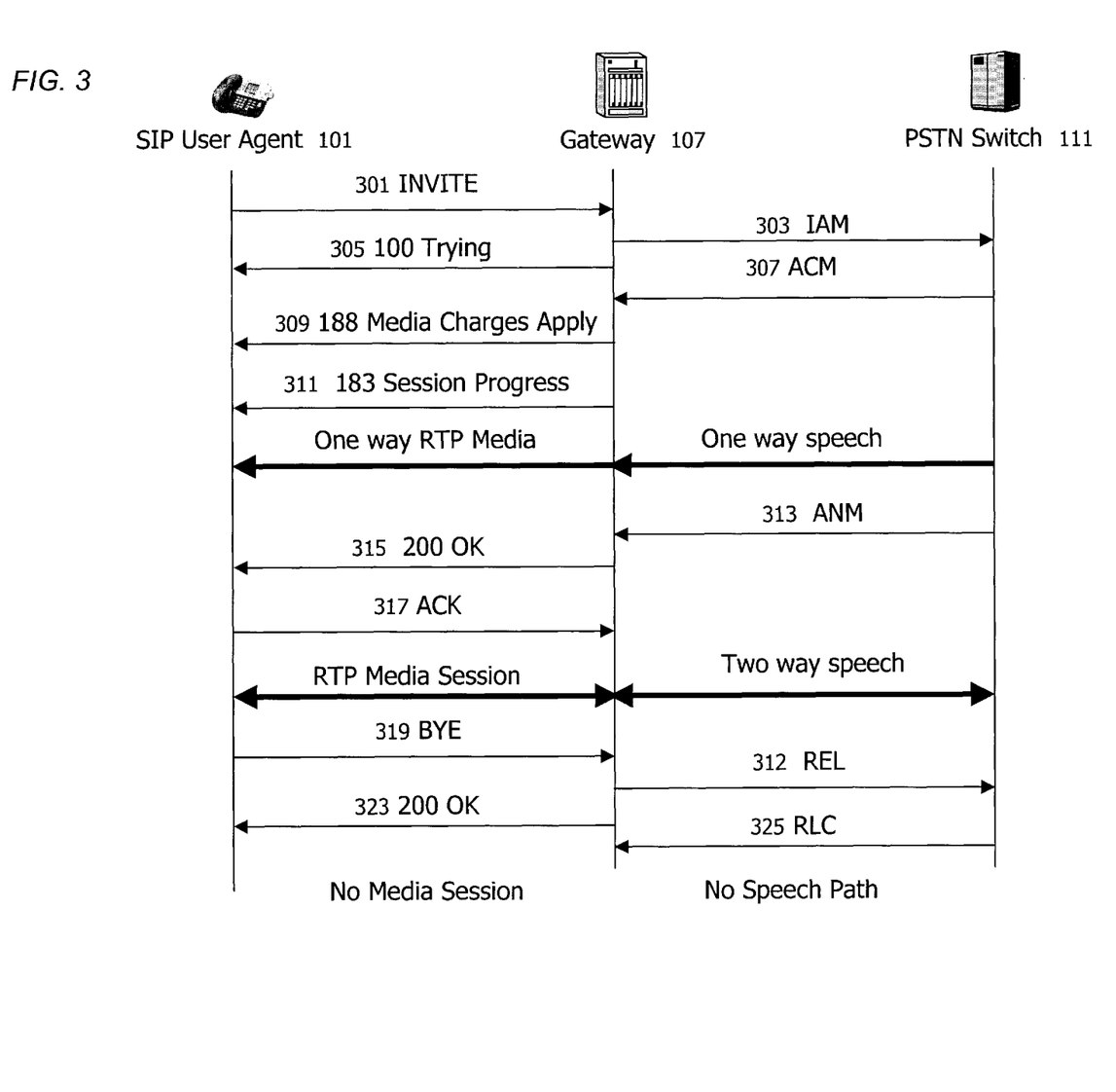
FIG. 3 is a diagram of a call flow for providing charging information of a call established over a data network of the system of FIG. 1, according to an embodiment of the present invention.

FIG. 3 is a diagram of a call flow for providing charging information of a call established over a data network of the system of FIG. 1, according to an embodiment of the present invention. In this example, it is assumed that the user agent 101 initiates a call via the gateway 107. In step 301, the user agent 101 sends an INVITE message to the gateway 107. The gateway 107, in turn, forwards an Initial Address Message (IAM) to a switch (not shown) within the PSTN 111, per step 303. The gateway 107, as in step 305, sends a 100 TRYING message to the user agent 101. Next, in step 307, the PSTN switch forwards an ACM message to the gateway 107. In step 309, a 188 MEDIA CHARGES APPLY message is sent to the user agent 101; this message may carry rate information or simply provide an indication that a charge is to be applied to the particular call established by the user agent 101. The gateway 107 then sends a 183 SESSION PROGRESS message to the user agent 101, per step 311. At this point, a one way RTP media session is established.

The PSTN switch, as in step 313, forwards an Answer Message (ANM) to the gateway 107, which then sends a 200 OK message to the user agent 101. In response to the message, the user agent 101 acknowledges with an ACK message, per step 317. As a result, a two-way media session is established between the user agent 101 and the PSTN switch. Next, in step 319, the user agent 101 seeks to terminate the call, and consequently, sends a BYE message to the gateway 107. In step 321, the gateway 107 sends a REL message to the PSTN switch. In step 323, the gateway 107 sends a 200 OK message to the user agent 101. The PSTN switch subsequently forwards a RLC message to the gateway 107, per step 325.

The above process advantageously provides the user agent 101 with charging information during the call establishment, thereby allowing the user to factor in cost considerations with respect to the call. Furthermore, the charging information can be used to determine the most economical call path through the system 100, as described below in FIG. 4.

Figure 4:
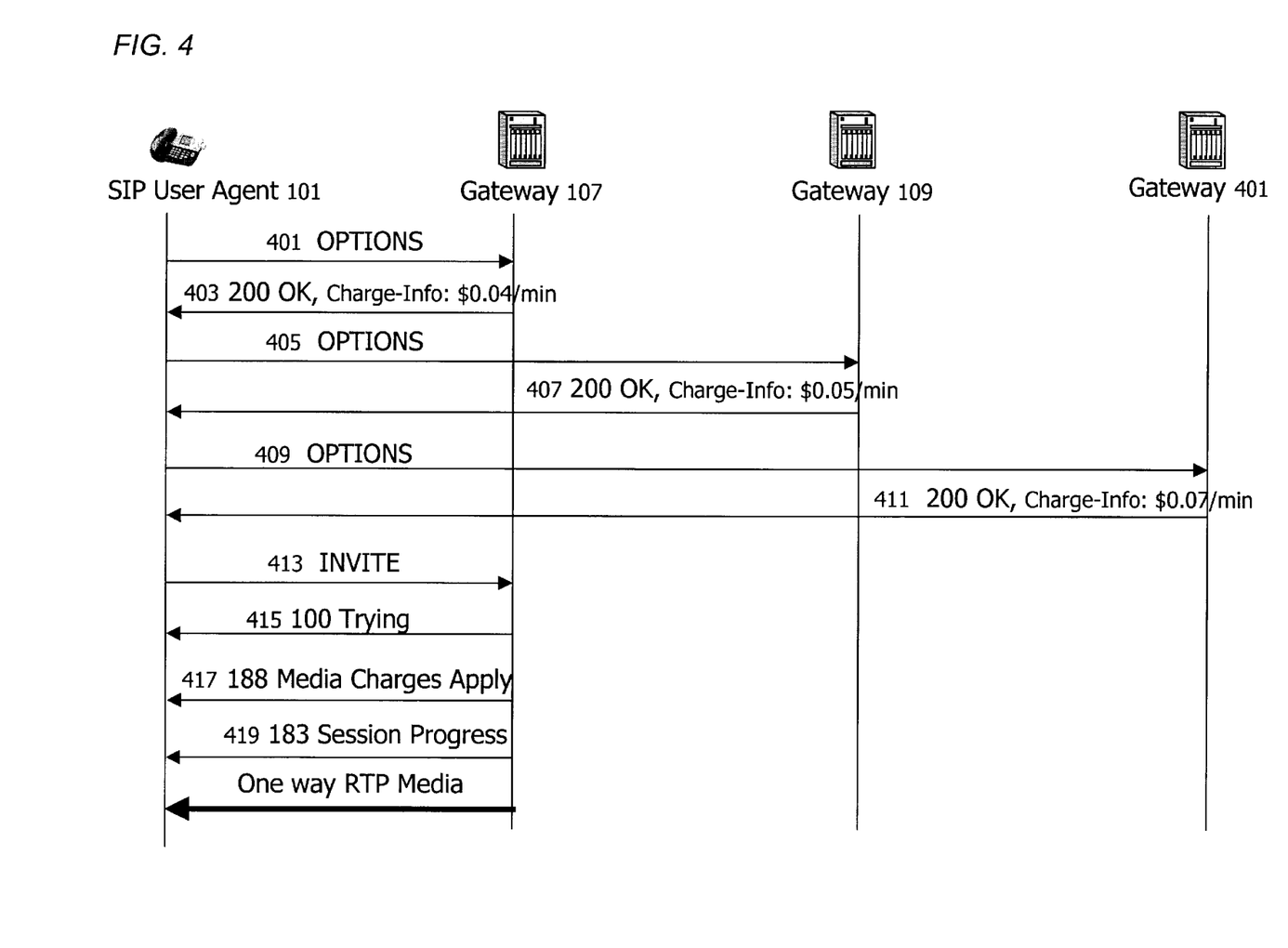
FIG. 4 is a diagram of a call flow for utilizing charging information to determine the most economical call path, according to an embodiment of the present invention.

FIG. 4 is a diagram of a call flow for utilizing charging information to determine the most economical call path, according to an embodiment of the present invention. Under this scenario, OPTIONS are used to discover rates associated with different call paths within the system 100. In this example, three different gateways 107, 109, 401 are utilized, of which only gateways 107, 109 are shown in FIG. 1, to establish a call that is initiated by the user agent 101.

In step 401, the user agent 101 sends an OPTIONS message to gateway 107, which replies with a 200 OK message that contains charging information (e.g., rate of $0.04/min.) within the Charge-Info header, per step 403. Next, in step 405, the user agent 101 sends an OPTIONS message to the gateway 109 to obtain charging information that is associated with placing a call via a path that includes the gateway 109. The gateway 109 responds with a 200 OK message containing charging information of $0.05/min. rate, per step 407.

Similarly, in step 409, the user agent 101 sends an OPTIONS message to a third gateway 401, which returns with charging information (e.g., rate of $0.07/min.) within the header of a 200 OK message. The user agent 101 now possesses the rate information of all of the available gateways 107, 109, 401 within the system 100.

Under this scenario, the user agent 101 elects to establishment a call in the most economical way, and accordingly, opts to send an INVITE message to the gateway with the lowest rate, which is the gateway 107 (step 413). In step 415, the gateway 107 sends a 100 TRYING to the user agent 101. The gateway 107, as in step 417, also sends a 188 MEDIA CHARGES APPLY message to the user agent 101. At which time, the user agent 101 may notify the user that the call is chargeable and may also provide the rate information (e.g., $0.04/min.). In step 419, the gateway 107 forwards a 183 SESSION PROGRESS message to the user agent 101. At this point, a one way RTP media session is established.

It is noted that non-SIP methods could be used to achieve the call establishment of the above call flow; however, it is noted that such methods may encounter the issue that the resulting INVITE may not get routed to the proper IP Telephony Service Provider. If a user agent client (UAC) succeeds in reaching the user agent server (UAS) with the OPTIONS, the resulting INVITE should also succeed. In the converse, if a Service Provider is not providing that service or is overloaded, the OPTIONS will either be ignored or will receive a non-200 OK response, in which case the Service Provider's rate structure is irrelevant.

As described, the above approach enables the use of SIP to discover least cost (in terms of media charges) routing, thereby advantageously reducing telecommunications costs for the user.

Figure 5:
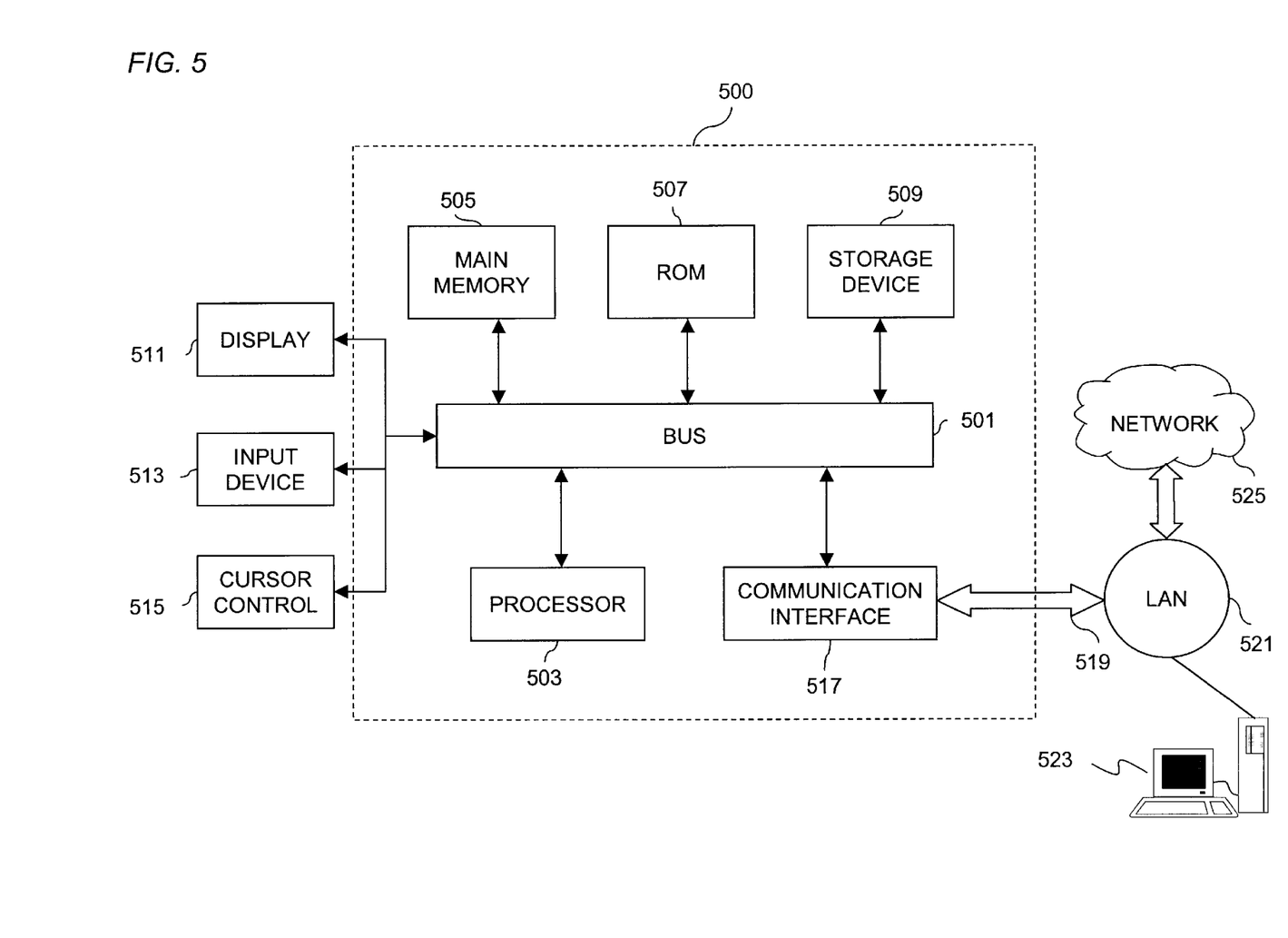
FIG. 5 is a diagram of a computer system that can be used to implement an embodiment of the present invention.

FIG. 5 illustrates a computer system 500 upon which an embodiment according to the present invention can be implemented. The computer system 500 includes a bus 501 or other communication mechanism for communicating information, and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions to be executed by the processor 503. The computer system 500 further includes a read only memory (ROM) 507 or other static storage device coupled to the bus 501 for storing static information and instructions for the processor 503. A storage device 509, such as a magnetic disk or optical disk, is additionally coupled to the bus 501 for storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is cursor control 515, such as a mouse, a trackball, or cursor direction keys for communicating direction information and command selections to the processor 503 and for controlling cursor movement on the display 511.

According to one embodiment of the invention, the call flows of FIGS. 3 and 4 are supported by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, or a telephone modem to provide a data communication connection to a corresponding type of telephone line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although only a single communication interface 517 is shown, it is recognized that multiple communication interfaces may be employed to communicate with different networks and devices.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by service provider. The local network 521 and network 525 both use electrical, electromagnetic, or optical signals to convey information and instructions. The signals through the various networks and the signals on network link 519 and through communication interface 517, which communicate digital data with computer system 500, are exemplary forms of carrier waves bearing the information and instructions.

The computer system 500 can send messages and receive data, including program code, through the network(s), network link 519, and communication interface 517. In the Internet example, a server (not shown) might transmit requested code belonging an application program for implementing an embodiment of the present invention through the network 525, local network 521 and communication interface 517. The processor 503 may execute the transmitted code while being received and/or store the code in storage device 59, or other non-volatile storage for later execution. In this manner, computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as storage device 509. Volatile media include dynamic memory, such as main memory 505. Transmission media include coaxial cables, copper wire and fiber optics, including the wires that comprise bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the present invention discloses a data communication system that support telephony services and has the capability to provide charging indicators and rates to an application layer protocol (e.g., Session Initiation Protocol (SIP)) call setup message exchange. This provides a notification mechanism for the caller to know before a call completes that there will be a charge, and what that charge will be once the call completes. The charging information is conveyed using visual and/or audio indicators to the caller. The above approach advantageously enhances network efficiency and reduces costs, while maintaining a standardized architecture.

While the present invention has been described in connection with a number of embodiments and implementations, the present invention is not so limited but covers various obvious modifications and equivalent arrangements, which fall within the purview of the appended claims.

What is claimed is:

1. A communication system for providing charging information of a call established over a data network, the system comprising:

a user agent configured to initiate a call to another user agent according to a Session Initiation Protocol; and a network element configured to assist in establishing the call and to forward the charging information indicating that the call is chargeable according to the Session Initiation Protocol, the charging information being forwarded to the user agent.

2. A system according to claim 1, wherein the user agent provides at least one of a visual indicator and an audio indicator based on the forwarded charging information.

3. A system according to claim 1, wherein the charging information is provided prior to completion of the call.

4. A system according to claim 1, wherein the charging information is provided before the establishment of the call.

5. A method for providing charging information of a call established over a data network, the method comprising:

establishing a call between a user agent and another user agent according to a Session Initiation Protocol; and forwarding the charging information to the user agent according to the Session Initiation Protocol, the charging information indicating that the call is chargeable to the user agent.

6. A method according to claim 5, wherein the user agent in the forwarding step provides at least one of a visual indicator and an audio indicator based on the forwarded charging information.

7. A method according to claim 5, wherein the charging information in the forwarding step is provided prior to completion of the call.

8. A method according to claim 5, wherein the charging information in the forwarding step is provided before the establishment of the call.

9. A communication system for providing charging information of a call established over a data network, the system comprising:

means for establishing a call between a user agent and another user agent according to a Session Initiation Protocol; and means for forwarding the charging information to the user agent according to the Session Initiation Protocol, the charging information indicating that the call is chargeable to the user agent.

10. A system according to claim 9, wherein the user agent provides at least one of a visual indicator and an audio indicator based on the forwarded charging information.

11. A system according to claim 9, wherein the charging information is provided prior to completion of the call.

12. A system according to claim 9, wherein the charging information in the forwarding step is provided before the establishment of the call.

13. A network apparatus for providing charging information of a call established over a data network, the apparatus comprising:
a communications interface configured to receive a message from a user agent to establish a call to another user agent according to a Session Initiation Protocol; and
a processor coupled to the communications interface and configured to instruct the communications interface to forward the charging information to the user agent according to the Session Initiation Protocol, the charging information indicating that the call is chargeable to the user agent.

14. An apparatus according to claim 13, wherein the user agent provides at least one of a visual indicator and an audio indicator based on the forwarded charging information.

15. An apparatus according to claim 13, wherein the charging information is provided prior to completion of the call.

16. An apparatus according to claim 13, wherein the charging information is provided before the establishment of the call.

17. A computer-readable medium carrying one or more sequences of one or more instructions for providing charging information of a call established over a data network, the one or more sequences of one or more instructions including instructions which, when executed by one or more processors, cause the one or more processors to perform the steps of:

establishing a call between a user agent and another user agent according to a Session Initiation Protocol; and
forwarding the charging information to the user agent according to the Session Initiation Protocol, the charging information indicating that the call is chargeable to the user agent.

18. A computer-readable medium according to claim 17, wherein the user agent in the forwarding step provides at least one of a visual indicator and an audio indicator based on the forwarded charging information.

19. A computer-readable medium according to claim 17, wherein the charging information in the forwarding step is provided prior to completion of the call.

20. A computer-readable medium according to claim 17, wherein the charging information in the forwarding step is provided before the establishment of the call.

21. A method for supporting charging of a Session Initiation Protocol (SIP) call, the method comprising:
receiving a message from a source device, the message requesting establishment of the SIP call with a destination device; and
transmitting a provisional response message, according to the Session Initiation Protocol (SIP), to the source device, wherein the provisional response message notifies the source device that the SIP call has a charge applicable to the source device.

22. A method according to claim 21, further comprising:
receiving an options message requesting charging information associated with the SIP call, wherein the charging information corresponds to a most economical one of a plurality of paths to the destination device over the data network; and
establishing the SIP call with the destination device using the one path.

23. A method according to claim 21, further comprising:
establishing the SIP call with the destination device if the source device acknowledges that the charge is acceptable.

* * * * *